US00RE42254E

(19) United States
(12) Reissued Patent
Wood, Jr.

(10) Patent Number: US RE42,254 E
(45) Date of Reissued Patent: *Mar. 29, 2011

(54) METHOD OF ADDRESSING MESSAGES AND COMMUNICATIONS SYSTEM

(75) Inventor: Clifton W. Wood, Jr., Tulsa, OK (US)

(73) Assignee: Round Rock Research, LLC, Mount Kisco, NY (US)

( * ) Notice: This patent is subject to a terminal disclaimer.

(21) Appl. No.: 11/862,130

(22) Filed: Sep. 26, 2007

Related U.S. Patent Documents

Reissue of:
(64) Patent No.: 6,282,186
Issued: Aug. 28, 2001
Appl. No.: 09/556,235
Filed: Apr. 24, 2000

U.S. Applications:
(63) Continuation of application No. 09/026,050, filed on Feb. 19, 1998, now Pat. No. 6,061,344.

(51) Int. Cl.
*H04L 1/00* (2006.01)

(52) U.S. Cl. ..... 370/346
(58) Field of Classification Search ..... None
See application file for complete search history.

(56) References Cited

U.S. PATENT DOCUMENTS

| | | | | |
|---|---|---|---|---|
| 4,075,632 A | | 2/1978 | Baldwin et al. | |
| 4,761,778 A | | 8/1988 | Hui | |
| 4,796,023 A | * | 1/1989 | King | 340/825.02 |
| 4,799,059 A | | 1/1989 | Grindahl et al. | |
| 4,845,504 A | | 7/1989 | Roberts et al. | |
| 4,862,453 A | | 8/1989 | West et al. | |
| 4,926,182 A | | 5/1990 | Ohta et al. | |
| 4,955,018 A | | 9/1990 | Twitty et al. | |

(Continued)

FOREIGN PATENT DOCUMENTS

| | | |
|---|---|---|
| EP | 779520 | 9/1997 |
| EP | 1072128 | 5/2008 |
| JP | 9054213 | 2/1997 |
| JP | 2002228809 | 8/2002 |
| WO | 97048216 | 12/1997 |
| WO | 99043127 | 8/1999 |
| WO | 2008094728 | 8/2008 |

OTHER PUBLICATIONS

Auto–ID Center, Massachusetts Institute of Technology, "13.56 MHz ISM Band Class 1 Radio Frequency Identification Tag Interface Specification: Recommended Standard," Technical Report, Feb. 1, 2003.

(Continued)

*Primary Examiner*—Ajit Patel
(74) *Attorney, Agent, or Firm*—Gazdzinski & Associates, PC

(57) ABSTRACT

A method of establishing wireless communications between an interrogator and individual ones of multiple wireless identification devices, the method comprising utilizing a tree search method to attempt to identify individual ones of the multiple wireless identification devices so as to be able to perform communications, without collision, between the interrogator and individual ones of the multiple wireless identification devices, a search tree being defined for the tree search method, the tree having multiple nodes respectively representing subgroups of the multiple wireless identification devices, wherein the interrogator transmits a command at a node, requesting that devices within the subgroup represented by the node respond, wherein the interrogator determines if a collision occurs in response to the command and, if not, repeats the command at the same node. An interrogator configured to transmit a command at a node, requesting that devices within the subgroup represented by the node respond, the interrogator further being configured to determine if a collision occurs in response to the command and, if not, to repeat the command at the same node.

91 Claims, 3 Drawing Sheets

U.S. PATENT DOCUMENTS 4,969,146 A 11/1990 Twitty et al.
5,019,813 A 5/1991 Kip et al.
5,025,486 A 6/1991 Klughart
5,046,066 A 9/1991 Messenger
5,055,968 A 10/1991 Nishi et al.
5,121,407 A 6/1992 Partyka et al.
5,124,697 A 6/1992 Moore
5,142,694 A * 8/1992 Jackson et al. ..... 455/67.11
5,144,313 A 9/1992 Kirknes
5,144,668 A 9/1992 Malek et al.
5,150,114 A 9/1992 Johansson
5,150,310 A 9/1992 Greenspun et al.
5,164,985 A 11/1992 Nysen et al.
5,168,510 A 12/1992 Hill
5,194,860 A 3/1993 Jones et al.
5,231,646 A 7/1993 Heath et al.
5,266,925 A 11/1993 Vercellotti et al.
5,307,463 A 4/1994 Hyatt et al.
5,365,551 A 11/1994 Sondgrass et al.
5,373,503 A 12/1994 Chen
5,449,296 A * 9/1995 Jacobsen et al. ..... 439/322
5,461,627 A * 10/1995 Rypinski ..... 370/346
5,479,416 A 12/1995 Snodgrass et al.
5,500,650 A 3/1996 Snodgrass et al.
5,530,702 A 6/1996 Palmer et al.
5,550,547 A 8/1996 Chan et al.
5,583,850 A 12/1996 Snodgrass et al.
5,608,739 A 3/1997 Snodgrass et al.
5,619,648 A 4/1997 Canale et al.
5,621,412 A 4/1997 Sharpe et al.
5,625,628 A 4/1997 Heath
5,627,544 A 5/1997 Snodgrass et al.
5,640,151 A 6/1997 Reis et al.
5,649,296 A 7/1997 MacLellan et al.
5,686,902 A 11/1997 Reis et al.
5,790,946 A 8/1998 Rotzoll
5,805,586 A 9/1998 Perreault et al.
5,841,770 A 11/1998 Snodgrass et al.
5,914,671 A 6/1999 Tuttle
5,936,560 A 8/1999 Higuchi
5,940,006 A 8/1999 MacLellan et al.
5,942,987 A 8/1999 Heinrich et al.
5,952,922 A 9/1999 Shober
5,966,471 A 10/1999 Fisher et al.
5,974,078 A 10/1999 Tuttle et al.
5,988,510 A 11/1999 Tuttle et al.
6,038,455 A 3/2000 Gardner et al.
6,061,344 A 5/2000 Wood, Jr.
6,072,801 A 6/2000 Wood, Jr. et al.
6,075,973 A 6/2000 Greeff et al.
6,097,292 A 8/2000 Kelly et al.
6,104,333 A 8/2000 Wood, Jr.
6,118,789 A 9/2000 Wood, Jr.
6,130,602 A 10/2000 O'Toole et al.
6,130,623 A 10/2000 MacLellan et al.
6,150,921 A 11/2000 Werb et al.
6,157,633 A 12/2000 Wright
6,169,474 B1 1/2001 Greeff et al.
6,177,858 B1 1/2001 Raimbault et al.
6,185,307 B1 2/2001 Johnson, Jr.
6,192,222 B1 2/2001 Greeff et al.
6,216,132 B1 4/2001 Chandra et al.
6,226,300 B1 5/2001 Hush et al.
6,229,987 B1 5/2001 Greeff et al.
6,243,012 B1 6/2001 Shober et al.
6,265,962 B1 7/2001 Black et al.
6,265,963 B1 7/2001 Wood, Jr.
6,275,476 B1 8/2001 Wood, Jr.
6,282,186 B1 8/2001 Wood, Jr.
6,288,629 B1 9/2001 Cofino et al.
6,289,209 B1 9/2001 Wood, Jr.
6,307,847 B1 10/2001 Wood, Jr.
6,307,848 B1 10/2001 Wood, Jr. et al.
6,324,211 B1 11/2001 Ovard et al.
6,415,439 B1 7/2002 Randell et al.
6,459,726 B1 10/2002 Ovard et al.
6,483,427 B1 11/2002 Werb
6,566,997 B1 5/2003 Bradin
6,570,487 B1 5/2003 Steeves
6,707,376 B1 3/2004 Patterson et al.
6,714,559 B1 3/2004 Meier
6,771,634 B1 8/2004 Wright
6,778,096 B1 8/2004 Ward et al.
6,784,787 B1 * 8/2004 Atkins et al. ..... 340/10.4
6,850,510 B2 2/2005 Kubler et al.
6,919,793 B2 * 7/2005 Heinrich et al. ..... 340/10.32
7,026,935 B2 4/2006 Diorio et al.
7,315,522 B2 1/2008 Wood, Jr.
7,385,477 B2 6/2008 O'Toole et al.
7,672,260 B2 3/2010 Wood, Jr.
2003/0235184 A1 12/2003 Dorenbosch
2005/0060069 A1 3/2005 Breed et al.
2005/0207364 A1 9/2005 Wood, Jr.
2006/0022800 A1 2/2006 Krishna et al.
2006/0022801 A1 2/2006 Husak et al.
2006/0022815 A1 2/2006 Fischer
2006/0056325 A1 3/2006 Wood, Jr.
2006/0209781 A1 9/2006 Wood, Jr.
2007/0139164 A1 6/2007 O'Toole et al.
2007/0176751 A1 * 8/2007 Cesar et al. ..... 340/10.32
2008/0007412 A1 1/2008 Wood, Jr.
2008/0042806 A1 2/2008 Wood, Jr.
2008/0048832 A1 * 2/2008 O'Toole et al. ..... 340/10.1
2008/0048835 A1 * 2/2008 O'Toole et al. ..... 340/10.4
2008/0129485 A1 6/2008 Tuttle
2008/0180221 A1 7/2008 Tuttle
2009/0322491 A1 12/2009 Wood, Jr.

OTHER PUBLICATIONS

Capetanakis, John I., "Generalized TDMA: The Multi–Accessing Tree Protocol," IEEE Transactions on Information Theory, vol. Com. 27, No. 10, pp. 1476–1484, Oct. 1979.

Capetanakis, John I., "Tree Algorithms for Packet Broadcast Channels", IEEE Transactions on Information Theory, vol. IT–25, No. 5, pp. 505–515, Sep. 1979.

CNN Money, "Manhattan Associates Announces Next–Generation Microsoft–Based RFID Solutions," located at http://money.cnn.com/services/tickerheadlines/prn/cltu045.PI.09162003122727.24911.htm, Sep. 16, 2003.

Engels, Daniel, "The Use of the Electronic Product Code," Auto–ID Center, Massachusetts Institute of Technology, Technical Report, Feb. 1, 2003.

EPC Global, Inc. "EPC Radio Frequency Identity Protocols—Class–1 Generation–2 UHF RFID—Protocol for Communications at 860 MHz–960MHz," version 1.0.9, cover sheet and p. 37–38, Jan. 2005.

eRetailNews, "The Electronic Product Code (EPC)—A Technology Revolution?" located at http://www.eretailnews.com/features/0105epc1.htm, accessed Oct. 15, 2003.

eRetail News, "The Electronic Product Code (EPC)," located at http://www.eretailnews.com/features/epc/htm, accessed Oct. 15, 2003.

eRetailNews, "The Electronic Product Code Schematic," located at http://eee.eretailnews.com/features/0105epcschema.htm, accessed Oct. 15, 2003.

Extended Search Report and Search Opinion for EP Patent Application No. 05016513.3, Jan. 22, 2007.

Extended Search Report and Search Opinion for EP Patent Application No. 05016514.1, Jan. 26, 2007.
High Tech Aid, "ISO/IEC 18000—RFID Air Interface Standards," located at http://www.hightechaid.com/standards/18000.htm, Feb. 1, 2003.
Humblet, Pierre A. et al., "Efficient Accessing of a Multiaccess Channel," Proceedings of the 19th IEEE Conference on Decision and Control including the Symposium on Adaptive Processes, pp. 624–627, 1980.
ISO/IEC, "Automatic Identification—Radio Frequency Identification for Item Management—Communications and Interfaces—Part 3: Physical Layer, Anti Collision System and Protocol Values at 13.56 MHz MODE 4," ISO/IEC 18000–3–4, Mar. 1, 2001.
ISO/IEC, "Automatic Identification—Radio Frequency Identification for Item Management—Communications and Interfaces—Part 3: Physical Layer, Anti–Collision System and Protocol Values at 13.56 MHz MODE 1," ISO/IEC 18000–3–1, Mar. 1, 2001.
ISO/IEC, "Identification Cards—Contactless Integrated Circuit(s) Cards—Proximity Cards—Part 1: Physical Characteristics," ISO/IEC FCD 14443–1, 1997.
ISO/IEC, "Identification Cards—Contactless Integrated Circuit(s) Cards—Proximity Cards—Part 2: Radio Frequency Power and Signal Interface," ISO/IEC FCD 14443–2, Mar. 26, 1999.
ISO/IEC, "Identification Cards—Contactless Integrated Circuit(s) Cards—Proximity Cards—Part 3: Initiation and Anticollision," ISO/IEC FDIS 14443–3:2000(E), Jul. 13, 2000.
ISO/IEC, "Identification Cards—Contactless Integrated Circuit(s) Cards—Proximity Cards—Part 4: Transmission Protocol," ISO/IEC FDIS 14443–4:2000(E), Jul. 13, 2000.
ISO/IEC, "Identification Cards—Contactless Integrated Circuit(s) Cards—Vicinity Cards—Part 1: Physical Characteristics," ISO/IEC FDIS 15693–1:2000(E), May 19, 2000.
ISO/IEC, "Identification Cards—Contactless Integrated Circuit(s) Cards—Vicinity Cards—Part 2: Interface and Initialization," ISO/IEC FDIS 15693–2:2000(E), Feb. 3, 2000.
ISO/IEC, "Identification Cards—Contactless Integrated Circuit(s) Cards—Vicinity Cards—Part 3: Anticollision and Transmission Protocol," ISO/IEC CD 15693–3:1999(E), Nov. 17, 1999.
ISO/IEC, "Information Technology AIDC Techniques—RFID for Item Management—Air Interface—Part 3: Paramenters for Air Interface Communications at 13.56 MHz," ISO/IEC 18000–3 FCD, May 27, 2002.
Mullen, Eileen, "Electronic Product Code," Baseline Magazine, located at www.baselinemag.com/article2/0,3959,655991,00 asp, Sep. 5, 2002.
RFID Journal, "Second Source of Class 1 EPC Chips," located at http://www.rfidjournal.com/article/articleview/473/1/1/, Jun. 26, 2003.
Wolf, Jack Keil, "Principles of Group Testing and an Application to the Design and Analysis of Multi–Access Protocols," NATO ASI Series E, Applied Sciences, No. 91, pp. 237–257, 1985.
Zebra Technologies Corporation, "Electronic Product Code (EPC)," located at http://www.rfid.zebra.com/epc/htm, accessed Oct. 15, 2003.
Finkenzeller, Klaus, "Radio Frequency Identification—The Authors Homepage of the RFID Handbook," located at http://www.rfid–handbook.com, accessed Feb. 22, 2007.
Smart Active Labels Consortium, organization homepage located at http://www.sal–c.org, accessed Feb. 22, 2007.
Symbol Technologies, Inc., "Understanding Gen 2: What It Is, How You Will Benefit and Criteria for Vendor Assessment," white paper, Jan. 2006.
Wright, Jim, "Trends and Innovations in RF Indentification," SUN Microsystems Inc. presentation, Mar. 2005.
Wood, Jr., Clifton W., Reissue U.S. Appl. No. 10/693,697, filed Oct. 23, 2003.
Wood, Jr., Clifton W., Reissue U.S. Appl. No. 11/865,580, filed Oct. 1, 2007.
Wood, Jr., Clifton W., Reissue U.S. Appl. No. 11/865,584, filed Oct. 1, 2007.
Wood, Jr., Clifton W., Reissue U.S. Appl. No. 10/652,573, filed Aug. 28, 2008.
Wood, Jr., Clifton W., Reissue U.S. Appl. No. 11/862,121, filed Sep. 26, 2007.
International Application No. PCT/US08/50630, Written Opinion, Jun. 27, 2008.
International Application No. PCT/US08/50630, International Search Report, Jun. 27, 2008.
Tuttle, John R., U.S. Appl. No. 11/755,073 entitled "Methods and Systems of Receiving Data Payload of RFID Tags," filed May 30, 2007.
International Application No. PCT/US99/02288, Written Opinion, Jan. 27, 2000.
Wood, Jr., Clifton W., Reissue U.S. Appl. No. 10/693,696, filed Oct. 23, 2003.
International Application No. PCT/US99/02288, International Search Report, Aug. 3, 1999.
Wood, Jr., Clifton W., Reissue U.S. Appl. No. 11/859,360, filed Sep. 21, 2007.
Wood, Jr., Clifton W., Reissue U.S. Appl. No. 11/859,364, filed Sep. 21, 2007.
Wood, Jr., Clifton W., Reissue U.S. Appl. No. 11/862,124, filed Sep. 26, 2007.
USPTO Transaction History of U.S. Appl. No. 09/026,043, filed Feb. 19, 1998, entitled "Method of Addressing Messages and Communications System," now U.S. Patent No. 6,118,789.
USPTO Transaction History of U.S. Appl. No. 09/026,045, filed Feb. 19, 1998, entitled "Method of Addressing Messages, Methods of Establishing Wireless Communications, and Communications System," now U.S. Patent No. 6,072,801.
USPTO Transaction History of U.S. Appl. No. 09/026,050, filed Feb. 19, 1998, entitled "Method of Addressing Messages and Communications System," now U.S. Patent No. 6,061,344.
USPTO Transaction History of U.S. Appl. No. 09/026,248, filed Feb. 19, 1998, entitled "Method of Addressing Messages and Communications System," now U.S. Patent No. 6,275,476.
USPTO Transaction History of U.S. Appl. No. 09/551,304, filed Apr. 18, 2000, entitled "Method of Addressing Messages and Communications Systems," now U.S. Patent No. 6,282,186.
USPTO Transaction History of U.S. Appl. No. 09/556,235, filed Apr. 18, 2000, entitled "Method of Addressing Messages, and Establishing Communications Using a Tree Search Technique That Skips Levels," now U.S. Patent No. 6,226,300.
USPTO Transaction History of U.S. Appl. No. 09/617,390, filed Jul. 17, 2000, entitled "Method of Addressing Messages and Communications System," now U.S. Patent No. 6,307,847.

USPTO Transaction History of U.S. Appl. No. 09/773,461, filed Jan. 31, 2001, entitled "Method of Addressing Messages, Methods of Establishing Wireless Communications, and Communications System," now U.S. Patent No. 6,307,848.

USPTO Transaction History of U.S. Appl. No. 09/820,467, filed Mar. 28, 2001, entitled "Method of Addressing Messages and Communications System," now U.s. Patent No. 7,315,522.

USPTO Transaction History of U.S. Appl. No. 10/652,573, filed Aug. 28, 2003, entitled "Method of Addressing Messages and Communications System."

USPTO Transaction History of U.S. Appl. No. 10/693,696, filed Oct. 23, 2003, entitled "Method and Apparatus to Select Radio Frequency Identification Devices in Accordance with an Arbitration Scheme."

USPTO Transaction History of U.S. Appl. No. 10/693,697, filed Oct. 23, 2003, entitled "Method of Addressing Messages, Methods of Establishing Wireless Communications, and Communications System."

USPTO Transaction History of U.S. Appl. No. 11/143,395, filed Jun. 1, 2005, entitled "Method of Addressing Messages and Communications System."

USPTO Transaction History of U.S. Appl. No. 11/270,204, filed Nov. 8, 2005, entitled "Method of Addressing Messages and Communications System."

USPTO Transaction History of U.S. Appl. No. 11/416,846, filed May 2, 2006, entitled "Method of Addressing Messages and Communications System."

USPTO Transaction History of U.S. Appl. No. 11/855,855, filed Sep. 14, 2007, entitled "Method of Addressing Messages and Communications System."

USPTO Transaction History of U.S. Appl. No. 11/855,860, filed Sep. 14, 2007, entitled "Method of Addressing Messages and Communications System."

USPTO Transaction History of U.S. Appl. No. 11/859,360, filed Sep. 21, 2007, entitled "Method of Addressing Messages and Communications System."

USPTO Transaction History of U.S. Appl. No. 11/859,364, filed Sep. 21, 2007, entitled "Method of Addressing Messages and Communications System."

USPTO Transaction History of U.S. Appl. No. 11/862,121, filed Sep. 26, 2007, entitled "Method of Addressing Messages and Communications System."

USPTO Transaction History of U.S. Appl. No. 11/862,124, filed Sep. 26, 2007, entitled "Method of Addressing Messages and Communications."

USPTO Transaction History of U.S. Appl. No. 11/865,580, filed Oct. 1, 2007, entitled "Method of Addressing Messages, Methods of Establishing Wireless Communications, and Communications System."

USPTO Transaction History of U.S. Appl. No. 11/865,584, filed Oct. 1, 2007, entitled "Method of Addressing Messages, Methods of Establishing Wireless Communications, and Communications System."

Wood, Jr., Clifton W., Reissue U.S. Appl. No. 12/493,542, filed Jun. 29, 2009.

Wood, Jr., Clifton W., Reissue U.S. Appl. No. 12/541,882, filed Aug. 14, 2009.

* cited by examiner

METHOD OF ADDRESSING MESSAGES AND COMMUNICATIONS SYSTEM

Matter enclosed in heavy brackets [ ] appears in the original patent but forms no part of this reissue specification; matter printed in italics indicates the additions made by reissue.

CROSS REFERENCE TO RELATED APPLICATION

[This] *More than one reissue application has been filed for the reissue of U.S. Pat. No. 6,282,186, which reissue applications are the initial reissue application Ser. No. 10/652,573, filed Aug. 28, 2003 and now U.S. Pat. No. RE40, 686, a continuation reissue application Ser. No. 11/862,121, filed Sep. 26, 2007, a continuation reissue application Ser. No. 11/862,124, filed Sep. 26, 2007, a continuation reissue application Ser. No. 12/541,882 , filed Aug. 14, 2009, and the present continuation reissue application, which* is a *continuation application of a reissue application Ser. No. 10/652, 573, filed Aug. 28, 2003, which is a reissue application of U.S. Pat. No. 6,282,186, issued from U.S. patent application Ser. No. 09/556,235, which is a continuation application* of U.S. patent application Ser. No. 09/026,050, filed Feb. 19, 1998, now U.S. Pat. No. 6,061,344 and titled "Method of Addressing Messages and Communications System".

TECHNICAL FIELD

This invention relates to communications protocols and to digital data communications. Still more particularly, the invention relates to data communications protocols in mediums such as radio communication or the like. The invention also relates to radio frequency identification devices for inventory control, object monitoring, determining the existence, location or movement of objects, or for remote automated payment.

BACKGROUND OF THE INVENTION

Communications protocols are used in various applications. For example, communications protocols can be used in electronic identification systems. As large numbers of objects are moved in inventory, product manufacturing, and merchandising operations, there is a continuous challenge to accurately monitor the location and flow of objects. Additionally, there is a continuing goal to interrogate the location of objects in an inexpensive and streamlined manner. One way of tracking objects is with an electronic identification system.

One presently available electronic identification system utilizes a magnetic coupling system. In some cases, an identification device may be provided with a unique identification code in order to distinguish between a number of different devices. Typically, the devices are entirely passive (have no power supply), which results in a small and portable package. However, such identification systems are only capable of operation over a relatively short range, limited by the size of a magnetic field used to supply power to the devices and to communicate with the devices.

Another wireless electronic identification system utilizes a large, board level, active transponder device affixed to an object to be monitored which receives a signal from an interrogator. The device receives the signal, then generates and transmits a responsive signal. The interrogation signal and the responsive signal are typically radio-frequency (RF) signals produced by an RF transmitter circuit. Because active devices have their own power sources, and do not need to be in close proximity to an interrogator or reader to receive power via magnetic coupling. Therefore, active transponder devices tend to be more suitable for applications requiring tracking of a tagged device that may not be in close proximity to an interrogator. For example, active transponder devices tend to be more suitable for inventory control or tracking.

Electronic identification systems can also be used for remote payment. For example, when a radio frequency identification device passes an interrogator at a toll booth, the toll booth can determine the identity of the radio frequency identification device, and thus of the owner of the device, and debit an account held by the owner for payment of toll or can receive a credit card number against which the toll can be charged. Similarly, remote payment is possible for a variety of other goods or services.

A communication system typically includes two transponders: a commander station or interrogator, and a responder station or transponder device which replies to the interrogator.

If the interrogator has prior knowledge of the identification number of a device which the interrogator is looking for, it can specify that a response is requested only from the device with that identification number. Sometimes, such information is not available. For example, there are occasions where the interrogator is attempting to determine which of multiple devices are within communication range.

When the interrogator sends a message to a transponder device requesting a reply, there is a possibility that multiple transponder devices will attempt to respond simultaneously, causing a collision, and thus causing an erroneous message to be received by the interrogator. For example, if the interrogator sends out a command requesting that all devices within a communications range identify themselves, and gets a large number of simultaneous replies, the interrogator may not be able to interpret any of these replies. Thus, arbitration schemes are employed to permit communications free of collisions.

In one arbitration scheme or system, described in commonly assigned U.S. Pat. Nos. 5,627,544; 5,583,850; 5,500, 650; and 5,365,551, all to Snodgrass et al. and all incorporated herein by reference, the interrogator sends a command causing each device of a potentially large number of responding devices to select a random number from a known range and use it as that device's arbitration number. By transmitting requests for identification to various subsets of the full range of arbitration numbers, and checking for an error-free response, the interrogator determines the arbitration number of every responder station capable of communicating at the same time. Therefore, the interrogator is able to conduct subsequent uninterrupted communication with devices, one at a time, by addressing only one device.

Another arbitration scheme is referred to as the Aloha or slotted Aloha scheme. This scheme is discussed in various references relating to communications, such us Digital Communications: Fundamentals and Application, Bernard Sklar, published January 1988 by Prentice Hall. In this type of scheme, a device will respond to an interrogator using one of many time domain slots selected randomly by the device. A problem with the Aloha scheme is that if there are many devices, or potentially many devices in the field (i.e. in communications range, capable of responding) then there must be many available slots or many collisions will occur. Having many available slots slows down replies. If the magnitude of the number of devices in a field is unknown, then many slots are needed. This results in the system slowing down significantly because the reply time equals the number of slots multiplied by the time period required for one reply.

An electronic identification system which can be used as a radio frequency identification device, arbitration schemes, and various applications for such devices are described in detail in commonly assigned U.S. patent application Ser. No. 08/705,043, filed Aug. 29, 1996, and incorporated herein by reference.

SUMMARY OF THE INVENTION

The invention provides a wireless identification device configured to provide a signal to identify the device in response to an interrogation signal.

One aspect of the invention provides a method of establishing wireless communications between an interrogator and individual ones of multiple wireless identification devices. The method comprises utilizing a tree search method to attempt to identify individual ones of the multiple wireless identification devices so as to be able to perform communications, without collision, between the interrogator and individual ones of the multiple wireless identification devices. A search tree is defined for the tree search method. The tree has multiple nodes respectively representing subgroups of the multiple wireless identification devices. The interrogator transmits a command at a node, requesting that devices within the subgroup represented by the node respond. The interrogator determines if a collision occurs in response to the command and, if not, repeats the command at the same node.

Another aspect of the invention provides a communications system comprising an interrogator, and a plurality of wireless identification devices configured to communicate with the interrogator in a wireless fashion. The interrogator is configured to employ tree searching to attempt to identify individual ones of the multiple wireless identification devices, so as to be able to perform communications without collision, between the interrogator and individual ones of the multiple wireless identification devices. The interrogator is configured to follow a search tree, the tree having multiple nodes respectively representing subgroups of the multiple wireless identification devices. The interrogator is configured to transmit a command at a node, requesting that devices within the subgroup represented by the node respond. The interrogator is further configured to determine if a collision occurs in response to the command and, if not, to repeat the command at the same node.

One aspect of the invention provides a radio frequency identification device comprising an integrated circuit including a receiver, a transmitter, and a microprocessor. In one embodiment, the integrated circuit is a monolithic single die single metal layer integrated circuit including the receiver, the transmitter, and the microprocessor. The device of this embodiment includes an active transponder, instead of a transponder which relies on magnetic coupling for power and therefore has a much greater range.

BRIEF DESCRIPTION OF THE DRAWINGS

Preferred embodiments of the invention are described below with reference to the following accompanying drawings.

FIG. 4 is a diagram illustrating a tree splitting sort method for establishing communication with a radio frequency identification device in a field of a plurality of such devices.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
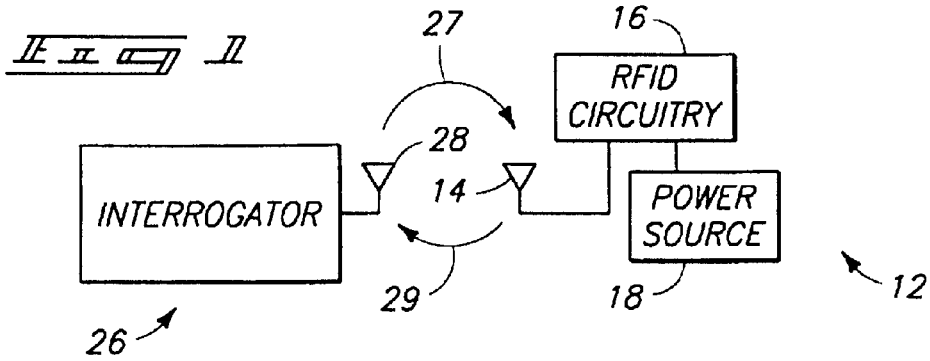
FIG. 1 is a high level circuit schematic showing an interrogator and a radio frequency identification device embodying the invention.

FIG. 1 illustrates a wireless identification device 12 in accordance with one embodiment of the invention. In the illustrated embodiment, the wireless identification device is a radio frequency data communication device 12, and includes RFID circuitry 16. The device 12 further includes at least one antenna 14 connected to the circuitry 16 for wireless or radio frequency transmission and reception by the circuitry 16. In the illustrated embodiment, the RFID circuitry is defined by an integrated circuit as described in the above-incorporated patent application Ser. No. 08/705,043, filed Aug. 29, 1996. Other embodiments are possible. A power source or supply 18 is connected to the integrated circuit 16 to supply power to the integrated circuit 16. In one embodiment, the power source 18 comprises a battery.

The device 12 transmits and receives radio frequency communications to and from an interrogator 26. An exemplary interrogator is described in commonly assigned U.S. patent application Ser. No. 08/907,689, filed Aug. 8, 1997 and incorporated herein by reference. Preferably, the interrogator 26 includes an antenna 28, as well as dedicated transmitting and receiving circuitry, similar to that implemented on the integrated circuit 16.

Generally, the interrogator 26 transmits an interrogation signal or command 27 via the antenna 28. The device 12 receives the incoming interrogation signal via its antenna 14. Upon receiving the signal 27, the device 12 responds by generating and transmitting a responsive signal or reply 29. The responsive signal 29 typically includes information that uniquely identifies, or labels the particular device 12 that is transmitting, so as to identify any object or person with which the device 12 is associated. Although only one device 12 is shown in FIG. 1, typically there will be multiple devices 12 that correspond with the interrogator 26, and the particular devices 12 that are in communication with the interrogator 26 will typically change over time. In the illustrated embodiment in FIG. 1, there is no communication between multiple devices 12. Instead, the devices 12 respectively communicate with the interrogator 26. Multiple devices 12 can be used in the same field of an interrogator 26 (i.e., within communications range of an interrogator 26).

The radio frequency data communication device 12 can be included in any appropriate housing or packaging. Various methods of manufacturing housings are described in commonly assigned U.S. patent application Ser. No. 08/800,037, filed Feb. 13, 1997, and incorporated herein by reference.

Figure 2:
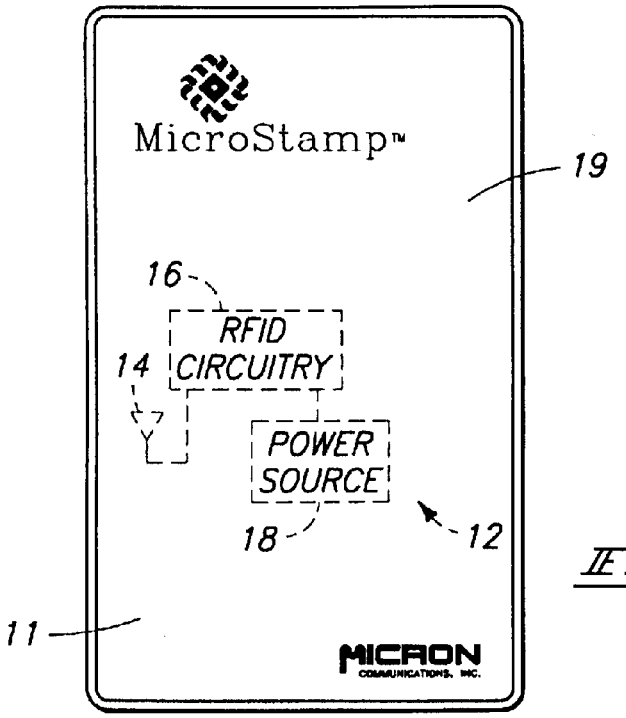
FIG. 2 is a front view of a housing, in the form of a badge or card, supporting the circuit of FIG. 1 according to one embodiment the invention.

FIG. 2 shows but one embodiment in the form of a card or badge 19 including a housing 11 of plastic or other suitable material supporting the device 12 and the power supply 18. In one embodiment, the front face of the badge has visual identification features such as graphics, text, information found on identification or credit cards, etc.

Figure 3:
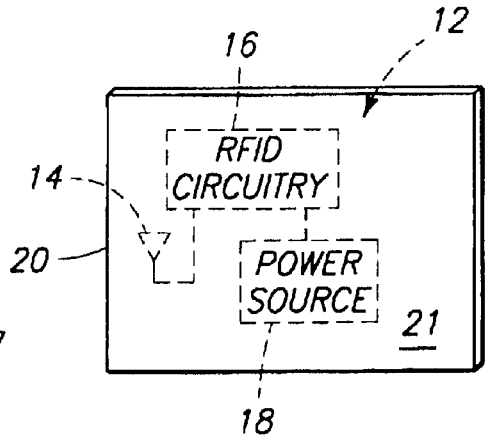
FIG. 3 is a front view of a housing supporting the circuit of FIG. 1 according to another embodiment of the invention.
Figure 2:
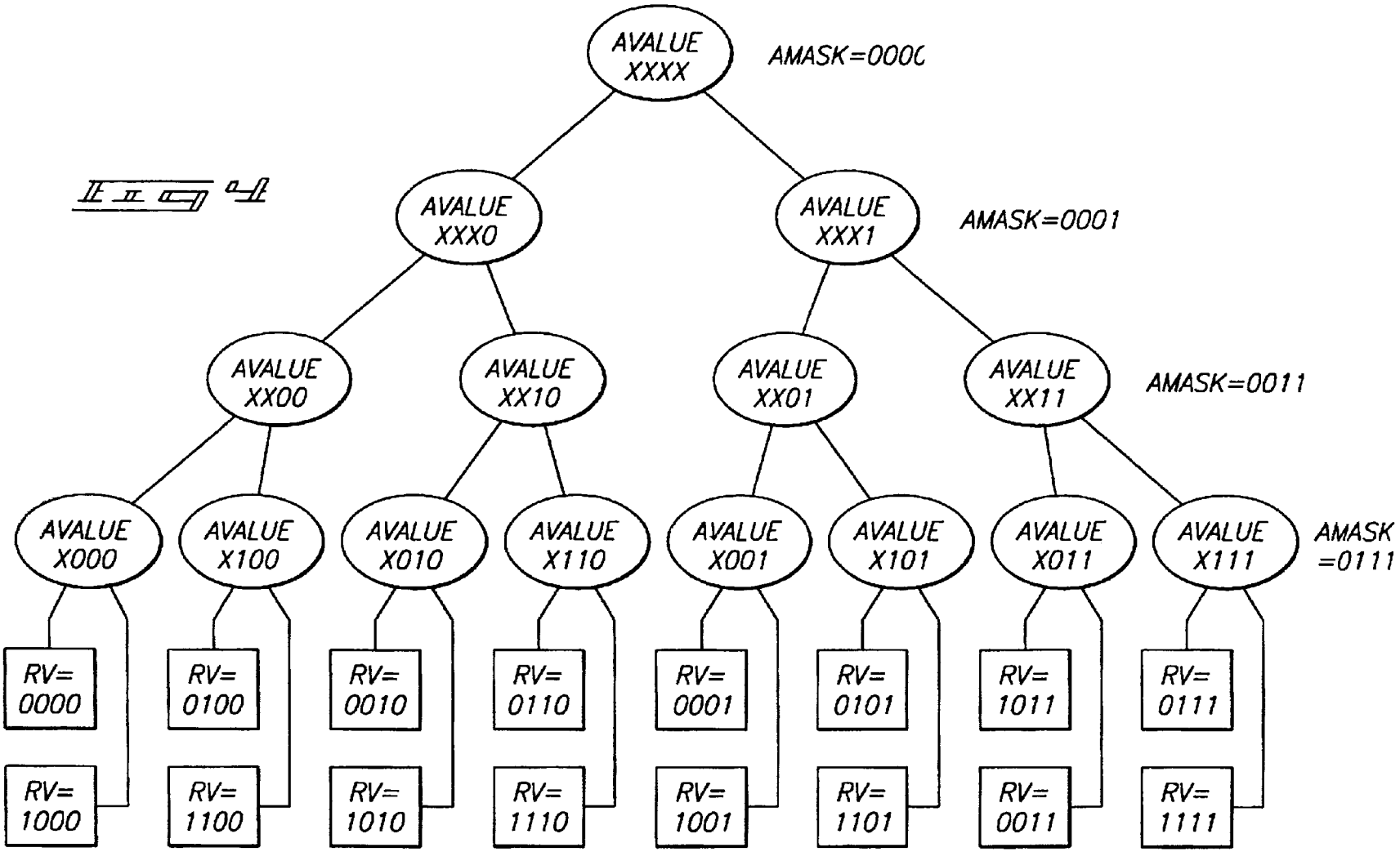

FIG. 3 illustrates but one alternative housing supporting the device 12. More particularly, FIG. 3 shows a miniature housing 20 encasing the device 12 and power supply 18 to define a tag which can be supported by an object (e.g., hung from an object, affixed to an object, etc.). Although two particular types of housings have been disclosed, other forms of housings are employed in alternative embodiments.

If the power supply 18 is a battery, the battery can take any suitable form. Preferably, the battery type will be selected depending on weight, size, and life requirements for a particular application. In one embodiment, the battery 18 is a thin profile button-type cell forming a small, thin energy cell more commonly utilized in watches and small electronic devices requiring a thin profile. A conventional button-type cell has a pair of electrodes, an anode formed by one face and a cathode formed by an opposite face. In an alternative embodiment, the power source 18 comprises a series connected pair of button type cells. In other alternative embodiments, other types of suitable power source are employed.

The circuitry 16 further includes a backscatter transmitter and is configured to provide a responsive signal to the interrogator 26 by radio frequency. More particularly, the circuitry 16 includes a transmitter, a receiver, and memory such as is described in U.S. patent application Ser. No. 08/705,043.

Radio frequency identification has emerged as a viable and affordable alternative to tagging or labeling small to large quantities of items. The interrogator 26 communicates with the devices 12 via an electromagnetic link, such as via an RF link (e.g., at microwave frequencies, in one embodiment), so all transmissions by the interrogator 26 are heard simultaneously by all devices 12 within range.

If the interrogator 26 sends out a command requesting that all devices 12 within range identify themselves, and gets a large number of simultaneous replies, the interrogator 26 may not be able to interpret any of these replies. Therefore, arbitration schemes are provided.

If the interrogator 26 has prior knowledge of the identification number of a device 12 which the interrogator 26 is looking for, it can specify that a response is requested only from the device 12 with that identification number. To target a command at a specific device 12, (i.e., to initiate point-on-point communication), the interrogator 26 must send a number identifying a specific device 12 along with the command. At start-up, or in a new or changing environment, these identification numbers are not known by the interrogator 26. Therefore, the interrogator 26 must identify all devices 12 in the field (within communication range) such as by determining the identification numbers of the devices 12 in the field. After this is accomplished, point-to-point communication can proceed as desired by the interrogator 26.

Generally speaking, RFID systems are a type of multiaccess communication system. The distance between the interrogator 26 and devices 12 within the field is typically fairly short (e.g., several meters), so packet transmission time is determined primarily by packet size and baud rate. Propagation delays are negligible. In such systems, there is a potential for a large number of transmitting devices 12 and there is a need for the interrogator 26 to work in a changing environment, where different devices 12 are swapped in and out frequently (e.g., as inventory is added or removed). In such systems, the inventors have determined that the use of random access methods work effectively for contention resolution (i.e., for dealing with collisions between devices 12 attempting to respond to the interrogator 26 at the same time).

RFID systems have some characteristics that are different from other communications systems. For example, one characteristic of the illustrated RFID systems is that the devices 12 never communicate without being prompted by the interrogator 26. This is in contrast to typical multiaccess systems where the transmitting units operate more independently. In addition, contention for the communication medium is short lived as compared to the ongoing nature of the problem in other multiaccess systems. For example, in a RFID system, after the devices 12 have been identified, the interrogator can communicate with them in a point-to-point fashion. Thus, arbitration in a RFID system is a transient rather than steady-state phenomenon. Further, the capability of a device 12 is limited by practical restrictions on size, power, and cost. The lifetime of a device 12 can often be measured in terms of number of transmissions before battery power is lost. Therefore, one of the most important measures of system performance in RFID arbitration is total time required to arbitrate a set of devices 12. Another measure is power consumed by the devices 12 during the process. This is in contrast to the measures of throughput and packet delay in other types of multiaccess systems.

FIG. 4 illustrates one arbitration scheme that can be employed for communication between the interrogator and devices 12. Generally, the interrogator 26 sends a command causing each device 12 of a potentially large number of responding devices 12 to select a random number from a known range and use it as that device's arbitration number. By transmitting requests for identification to various subsets of the full range of arbitration numbers, and checking for an error-free response, the interrogator 26 determines the arbitration number of every responder station capable of communicating at the same time. Therefore, the interrogator 26 is able to conduct subsequent unterrupted communication with devices 12, one at a time, by addressing only one device 12.

Three variables are used: an arbitration value (AVALUE), an arbitration mask (AMASK), and a random value ID (RV). The interrogator sends an Identify command (IdentifyCmnd) causing each device of a potentially large number of responding devices to select a random number from a known range and use it as that device's arbitration number. The interrogator sends an arbitration value (AVALUE) and an arbitration mask (AMASK) to a set of devices 12. The receiving devices 12 evaluate the following equation: (AMASK & AVALUE)==(AMASK & RV) wherein "&" is a bitwise AND function, and wherein "==" is an equality function. If the equation evaluates to "1" (TRUE), then the device 12 will reply. If the equation evaluates to "0" (FALSE), then the device 12 will not reply. By performing this in a structured manner, with the number of bits in the arbitration mask being increased by one each time, eventually a device 12 will respond with no collisions. Thus, a binary search tree methodology is employed.

An example using actual numbers will now be provided using only four bits, for simplicity, reference being made to FIG. 4. In one embodiment, sixteen bits are used for AVALUE and AMASK. Other numbers of bits can also be employed depending, for example, on the number of devices 12 expected to be encountered in a particular application, on desired cost points, etc.

Assume, for this example, that there are two devices 12 in the field, one with a random value (RV) of 1100 (binary), and another with a random value (RV) of 1010 (binary). The interrogator is tying to establish communications without collisions being caused by the two devices 12 attempting to communicate at the same time.

The interrogator sets AVALUE to 0000 (or "don't care" for all bits, as indicated by the character "X" in FIG. 4) and AMASK to 0000. The interrogator transmits a command to all devices 12 requesting that they identify themselves. Each of the devices 12 evaluate (AMASK & AVALUE)==(AMASK & RV) using the random value RV that the respective devices 12 selected. If the equation evaluates to "1" (TRUE), then the device 12 will reply. If the equation evaluates to "0" (FALSE), then the device 12 will not reply. In the first level of the illustrated tree, AMASK is 0000 and anything bitwise ANDed with all zeros results in all zeros, so both the devices 12 in the field respond, and there is a collision.

Next, the interrogator sets AMASK to 0001 and AVALUE to 0000 and transmits an Identify command. Both devices 12 in the field have a zero for their least significant bit, and (AMASK & AVALUE)==(AMASK & RV) will be true for both devices 12. For the device 12 with a random value of 1100, the left side of the equation is evaluated as follows (0001 & 0000)=0000.

The right side is evaluated as (0001 & 1100)=0000. The left side equals the right side, so the equation is true for the device 12 with the random value of 1100. For the device 12 with a random value of 1010, the left side of the equation is evaluated as (0001 & 0000)=0000. The right side is evaluated as (0001 & 1010)=0000. The left side equals the right side, so the equation is true for the device 12 with the random value of 1010. Because the equation is true for both devices 12 in the field, both devices 12 in the field respond, and there is another collision.

Recursively, the interrogator next sets AMASK to 0011 with AVALUE still at 0000 and transmits an Identify command. (AMASK & AVALUE)==(AMASK & RV) is evaluated for both devices 12. For the device 12 with a random value of 1100, the left side of the equation is evaluated as follows (0011 & 0000)=0000. The right side is evaluated as (0011 & 1100)=0000. The left side equals the right side, so the equation is true for the device 12 with the random value of 1100, so this device 12 responds. For the device 12 with a random value of 1010, the left side of the equation is evaluated as (0011 & 0000)=0000. The right side is evaluated as (0011 & 1010)=0010. The left side does not equal the right side, so the equation is false for the device 12 with the random value of 1010, and this device 12 does not respond. Therefore, there is no collision, and the interrogator can determine the identity (e.g., an identification number) for the device 12 that does respond.

De-recursion takes place, and the devices 12 to the right for the same AMASK level are accessed when AVALUE is set at 0010, and AMASK is set to 0011.

The device 12 with the random value of 1010 receives a command and evaluates the equation (AMASK & AVALUE)==(AMASK & RV). The left side of the equation is evaluated as (0011 & 0010)=0010. The right side of the equation is evaluated as (0011 & 1010)=0010. The right side equals the left side, so the equation is true for the device 12 with the random value of 1010. Because there are no other devices 12 in the subtree, a good reply is returned by the device 12 with the random value of 1010. There is no collision, and the interrogator 26 can determine the identity (e.g., an identification number) for the device 12 that does respond.

By recursion, what is meant is that a function makes a call to itself. In other words, the function calls itself within the body of the function. After the called function returns, de-recursion takes place and execution continues at the place just after the function call; i.e. at the beginning of the statement after the function call.

For instance, consider a function that has four statements (numbered 1,2,3,4) in it, and the second statement is a recursive call. Assume that the fourth statement is a return statement. The first time through the loop (iteration 1) the function executes the statement 2 and (because it is a recursive call) calls itself causing iteration 2 to occur. When iteration 2 gets to statement 2, it calls itself making iteration 3. During execution in iteration 3 of statement 1, assume that the function does a return. The information that was saved on the stack from iteration 2 is loaded and the function resumes execution at statement 3 (in iteration 2), followed by the execution of statement 4 which is also a return statement. Since there are no more statements in the function, the function de-recurses to iteration 1. Iteration 1, had previously recursively called itself in statement 2. Therefore, it now executes statement 3 (in iteration 1). Following that it executes a return at statement 4. Recursion is known in the art.

Consider the following code which can be used to implement operation of the method shown in FIG. 4 and described above.

Arbitrate(AMASK, AVALUE)

```
Arbitrate(AMASK, AVALUE)
    {
        collision=IdentifyCmnd(AMASK, AVALUE) if
            (collision) then
            {
                /* recursive call for left side */ Arbitrate
                    ((AMASK<<1)+1, AVALUE)
                /* recursive call for right side */ Arbitrate
                    ((AMASK<<1)+1, AVALUE+(AMASK+1))
            } /* endif */
    } /* return */
```

The symbol "<<" represents a bitwise left shift. "<<1" means shift left by one place. Thus, 0001<<1 would be 0010. Note, however, that AMASK is originally called with a value of zero, and 0000<<1 is still 0000. Therefore, for the first recursive call, AMASK=(AMASK<<1)+1. So for the first recursive call, the value of AMASK is 0000+0001=0001. For the second call, AMASK=(0001<<)+1=0010+1=0011. For the third recursive call, AMASK=(0011<<1)+1=0110+1=0111.

The routine generates values for AMASK and AVALUE to be used by the interrogator in an Identify command "IdentifyCmnd." Note that the routine calls itself if there is a collision. De-recursion occurs when there is no collision. AVALUE and AMASK would have values such as the following assuming collisions take place all the way down to the bottom of the tree.

| AVALUE | AMASK |
|---|---|
| 0000 | 0000 |
| 0000 | 0001 |
| 0000 | 0011 |
| 0000 | 0111 |
| 0000 | 1111* |
| 1000 | 1111* |
| 0100 | 0111 |
| 0100 | 1111* |
| 1100 | 1111* |

This sequence of AMASK, AVALUE binary numbers assumes that there are collisions all the way down to the bottom of the tree, at which point the Identify command sent by the interrogator is finally successful so that no collision occurs. Rows in the table for which the interrogator is successful in receiving a reply without collision are marked with the symbol "*". Note that if the Identify command was successful at, for example, the third line in the table then the interrogator would stop going down that branch of the tree and start down another, so the sequence would be as shown in the following table.

| AVALUE | AMASK |
|---|---|
| 0000 | 0000 |
| 0000 | 0001 |
| 0000 | 0011* |
| 0010 | 0011 |
| . . . | . . . |

This method is referred to as a splitting method. It works by splitting groups of colliding devices 12 into subsets that are resolved in turn. The splitting method can also be viewed as a type of tree search. Each split moves the method one level deeper in the tree. Either depth-first or breadth-first traversals of the tree can be employed. Depth first traversals are performed by using recursion, as is employed in the code listed above. Breadth-first traversals are accomplished by using a queue instead of recursion.

Either depth-first or breadth-first traversals of the tree can be employed. Depth first traversals are performed by using recursion, as is employed in the code listed above. Breadth-first traversals are accomplished by using a queue instead of recursion. The following is an example of code for performing a breadth-first traversal.

```
Arbitrate(AMASK, AVALUE)
    {
        enqueue(0,0)
        while (queue != empty)
            (AMASK, AVALUE) = dequeue( )
            collision=IdentifyCmnd(AMASK, AVALUE)
            if (collision) then
            {
                TEMP = AMASK + 1
                NEW AMASK = (AMASK << 1)+1
                enqueue(NEW_AMASK, AVALUE)
                enqueue(NEW_AMASK, AVALUE+TEMP
                } /* end if */
endwhile
}/* return */.
```

The symbol "!=" means not equal to. AVALUE and AMASK would have values such as those indicated in the following table for such code.

| AVALUE | AMASK |
|---|---|
| 0000 | 0000 |
| 0000 | 0001 |
| 0001 | 0001 |
| 0000 | 0011 |
| 0010 | 0011 |
| 0001 | 0011 |
| 0011 | 0011 |

-continued

| AVALUE | AMASK |
|---|---|
| 0000 | 0111 |
| 0100 | 0111 |
| . . . | . . . |

Rows in the table for which the interrogator is successful in receiving a reply without collision are marked with the symbol "*".

Figure 5:
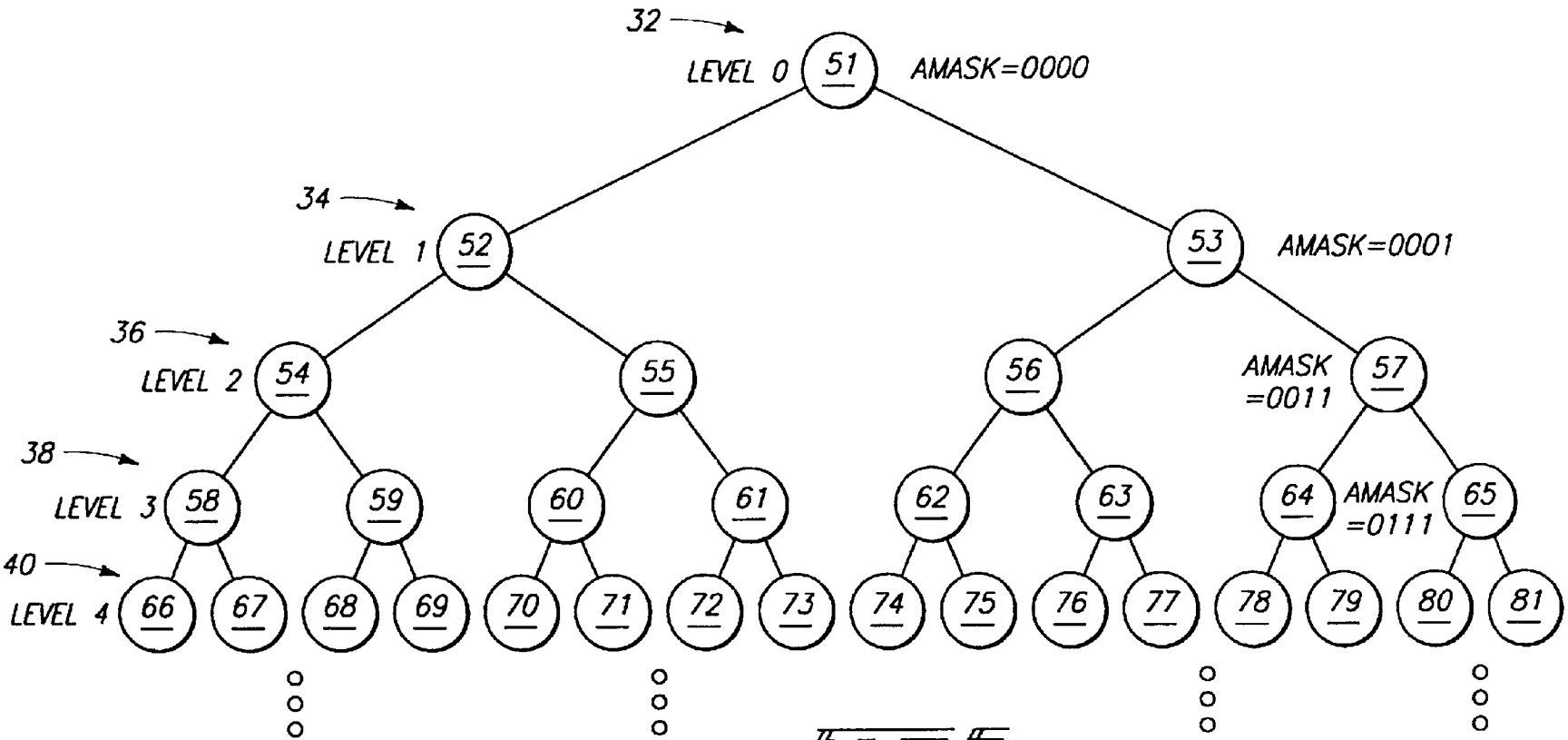
FIG. 5. is a diagram illustrating a modified tree splitting sort method for establishing communication with a radio frequency identification device in a field of a plurality of such devices.

FIG. 5 illustrates an embodiment wherein the interrogator 26 retries on the same node that yielded a good reply. The search tree has a plurality of nodes 51, 52, 53, 54 etc. at respective levels 32, 34, 36, 38, or 40. The size of subgroups of random values decrease in size by half with each node descended.

The interrogator performs a tree search, either depth-first or breadth-first in a manner such as that described in connection with FIG. 4, except that if the interrogator determines that no collision occurred in response to an Identify command, the interrogator repeats the command at the same node. This takes advantage of an inherent capability of the devices, particularly if the devices use back-scatter communication, called self-arbitration. Arbitration times can be reduced, and battery life for the devices can be increased.

When a single reply is read by the interrogator, for example, in node 52, the method described in connection with FIG. 4 would involve proceeding to node 53 and then sending another Identify command. Because a device 12 in a field of devices 12 can override weaker devices, this embodiment is modified such that the interrogator retries on the same node 52 after silencing the device 12 that gave the good reply. Thus, after receiving a good reply from node 52, the interrogator remains on node 52 and reissues the Identify command after silencing the device that first responded on node 52. Repeating the Identify command on the same node often yields other good replies, thus taking advantage of the devices natural ability to self-arbitrate.

AVALUE and AMASK would have values such as the following for a depth-first traversal in a situation similar to the one described above in connection with FIG. 4.

| AVALUE | AMASK |
|---|---|
| 0000 | 0000 |
| 0000 | 0001 |
| 0000 | 0011 |
| 0000 | 0111 |
| 0000 | 1111* |
| 0000 | 1111* |
| 1000 | 1111* |
| 1000 | 1111* |
| 0100 | 0111 |
| 0100 | 1111* |
| 0100 | 1111* |
| 1100 | 1111* |
| 1100 | 1111* |

Rows in the table for which the interrogator is successful in receiving a reply without collision are marked with the symbol "*".

In operation, the interrogator transmits a command at a node, requesting that devices within the subgroup represented by the node respond. The interrogator determines if a collision occurs in response to the command and, if not, repeats the command at the same node.

In one alternative embodiment, the upper bound of the number of devices in the field (the maximum possible number of devices that could communicate with the interrogator) is determined, and the tree search method is started at a level 32, 34, 36, 38, or 40 in the tree depending on the determined upper bound. The level of the search tree on which to start the tree search is selected based on the determined maximum possible number of wireless identification devices that could communicate with the interrogator. The tree search is started at a level determined by taking the base two logarithm of the determined maximum possible number. More particularly, the tree search is started at a level determined by taking the base two logarithm of the power of two nearest the determined maximum possible number of devices 12. The level of the tree containing all subgroups of random values is considered level zero, and lower levels are numbered 1, 2, 3, 4, etc. consecutively.

Methods involving determining the upper bound on a set of devices and starting at a level in the tree depending on the determined upper bound are described in a commonly assigned patent application (attorney docket MI40-118) naming Clifton W. Wood, Jr. as an inventor, titled "Method of Addressing Messages and Communications System," filed concurrently herewith, and incorporated herein by reference.

In one alternative embodiment, a method involving starting at a level in the tree depending on a determined upper bound (such as the method described in the commonly assigned patent application mentioned above) is combined with a method comprising re-trying on the same node that gave a good reply, such as the method shown and described in connection with FIG. 5.

Another arbitration method that can be employed is referred to as the "Aloha" method. In the Aloha method, every time a device 12 is involved in a collision, it waits a random period of time before retransmitting. This method can be improved by dividing time into equally sized slots and forcing transmissions to be aligned with one of these slots. This is referred to as "slotted Aloha." In operation, the interrogator asks all devices 12 in the field to transmit their identification numbers in the next time slot. If the response is garbled, the interrogator informs the devices 12 that a collision has occurred, and the slotted Aloha scheme is put into action. This means that each device 12 in the field responds within an arbitrary slot determined by a randomly selected value. In other words, in each successive time slot, the devices 12 decide to transmit their identification number with a certain probability.

The Aloha method is based on a system operated by the University of Hawaii. In 1971, the University of Hawaii began operation of a system named Aloha. A communication satellite was used to interconnect several university computers by use of a random access protocol. The system operates as follows. Users or devices transmit at any time they desire. After transmitting, a user listens for an acknowledgment from the receiver or interrogator. Transmissions from different users will sometimes overlap in time (collide), causing reception errors in the data in each of the contending messages. The errors are detected by the receiver, and the receiver sends a negative acknowledgment to the users. When a negative acknowledgment is received, the messages are retransmitted by the colliding users after a random delay. If the colliding users attempted to retransmit without the random delay, they would collide again. If the user does not receive either an acknowledgment or a negative acknowledgment within a certain amount of time, the user "times out" and retransmits the message.

There is a scheme known as slotted Aloha which improves the Aloha scheme by requiring a small amount of coordination among stations. In the slotted Aloha scheme, a sequence of coordination pulses is broadcast to all stations (devices). As is the case with the pure Aloha scheme, packet lengths are constant. Messages are required to be sent in a slot time between synchronization pulses, and can be started only at the beginning of a time slot. This reduces the rate of collisions because only messages transmitted in the same slot can interfere with one another. The retransmission mode of the pure 11 Aloha scheme is modified for slotted Aloha such that if a negative acknowledgment occurs, the device retransmits after a random delay of an integer number of slot times.

Aloha methods are described in a commonly assigned patent application (attorney docket MI40-089) naming Clifton W. Wood, Jr. as an inventor, titled "Method of Addressing Messages and Communications System," filed concurrently herewith, and incorporated herein by reference.

In one alternative embodiment, an Aloha method (such as the method described in the commonly assigned patent application mentioned above) is combined with a method involving re-trying on the same node that gave a good reply, such as the method shown and described in connection with FIG. 5.

In another embodiment, levels of the search tree are skipped. Skipping levels in the tree, after a collision caused by multiple devices 12 responding, reduces the number of subsequent collisions without adding significantly to the number of no replies. In real-time systems, it is desirable to have quick arbitration sessions on a set of devices 12 whose unique identification numbers are unknown. Level skipping reduces the number of collisions, both reducing arbitration time and conserving battery life on a set of devices 12. In one embodiment, every other level is skipped. In alternative embodiments, more than one level is skipped each time.

The trade off that must be considered in determining how many (if any) levels to skip with each decent down the tree is as follows. Skipping levels reduces the number of collisions, thus saving battery power in the devices 12. Skipping deeper (skipping more than one level) further reduces the number of collisions. The more levels that are skipped, the greater the reduction in collisions. However, skipping levels results in longer search times because the number of queries (Identify commands) increases. The more levels that are skipped, the longer the search times. Skipping just one level has an almost negligible effect on search time, but drastically reduces the number of collisions. If more than one level is skipped, search time increases substantially. Skipping every other level drastically reduces the number of collisions and saves battery power without significantly increasing the number of queries.

Level skipping methods are described in a commonly assigned patent application (attorney docket MI40-117) naming Clifton W. Wood, Jr. and Don Hush as inventors, titled "Method of Addressing Messages, Method of Establishing Wireless Communications, and Communications System," filed concurrently herewith, and incorporated herein by reference.

In one alternative embodiment, a level skipping method is combined with a method involving re-trying on the same node that gave a good reply, such as the method shown and described in connection with FIG. 5.

In yet another alternative embodiment, any two or more of the methods described in the commonly assigned, concurrently filed, applications mentioned above are combined.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

[1. A method of establishing wireless communications between an interrogator and wireless identification devices, the method comprising utilizing a tree search technique to establish communications, without collision, between the interrogator and individual ones of the multiple wireless identification devices, the method including using a search tree having multiple nodes respectively representing subgroups of the multiple wireless identification devices, the method further comprising, for a node, transmitting a command, using the interrogator, requesting that devices within the subgroup represented by the node respond, determining with the interrogator if a collision occurred in response to the command and, if not, repeating the command at the same node.]

[2. A method in accordance with claim 1 and further comprising, if a collision occurred in response to the first mentioned command, sending a command at a different node, using the interrogator.]

[3. A method in accordance with claim 1 wherein when a subgroup contains both a device that is within communications range of the interrogator, and a device that is not within communications range of the interrogator, the device that is not within communications range of the interrogator does not respond to the command.]

[4. A method in accordance with claim 1 wherein when a subgroup contains both a device that is within communications range of the interrogator, and a device that is not within communications range of the interrogator, the device that is within communications range of the interrogator responds to the command.]

[5. A method in accordance with claim 1 wherein a device in a subgroup changes between being within communications range of the interrogator and not being within communications range, over time.]

[6. A method in accordance with claim 1 wherein the wireless identification device comprises an integrated circuit including a receiver, a modulator, and a microprocessor in communication with the receiver and modulator.]

[7. A method of addressing messages from an interrogator to a selected one or more of a number of communications devices, the method comprising:

establishing for respective devices unique identification numbers;

causing the devices to select random values, wherein respective devices choose random values independently of random values selected by the other devices;

transmitting a communication, from the interrogator, requesting devices having random values within a first specified group of random values to respond;

receiving the communication at multiple devices, devices receiving the communication respectively determining if the random value chosen by the device falls within the first specified group and, if so, sending a reply to the interrogator; and determining using the interrogator if a collision occurred between devices that sent a reply and, if so, creating a second specified group smaller than the first specified group; and, if not, again transmitting a communication requesting devices having random values within the first specified group of random values to respond.]

[8. A method of addressing messages from an interrogator to a selected one or more of a number of communications devices in accordance with claim 7 wherein sending a reply to the interrogator comprises transmitting the unique identification number of the device sending the reply.]

[9. A method in accordance with claim 7 wherein one of the first and second specified groups contains both a device that is within communications range of the interrogator, and a device that is not within communications range of the interrogator, and wherein the device that is not within communications range of the interrogator does not respond to the interrogator.]

[10. A method of addressing messages from an interrogator to a selected one or more of a number of communications devices in accordance with claim 7 wherein, after receiving a reply without collision from a device, the interrogator sends a communication individually addressed to that device.]

[11. A method of addressing messages from a transponder to a selected one or more of a number of communications devices, the method comprising:

establishing unique identification numbers for respective devices;

causing the devices to select random values, wherein respective devices choose random values independently of random values selected by the other devices;

transmitting a communication from the transponder requesting devices having random values within a specified group of a plurality of possible groups of random values to respond, the plurality of possible groups being organized in a binary tree defined by a plurality of nodes at respective levels, the specified group being defined as being at one of the nodes;

receiving the communication at multiple devices, devices receiving the communication respectively determining if the random value chosen by the device falls within the specified group and, if so, sending a reply to the transponder; and, if not, not sending a reply; and determining using the transponder if a collision occurred between devices that sent a reply and, if so, creating a new, smaller, specified group by descending in the tree; and, if not, transmitting a communication at the same node.]

[12. A method of addressing messages from a transponder to a selected one or more of a number of communications devices in accordance with claim 11 wherein establishing unique identification numbers for respective devices comprises establishing a predetermined number of bits to be used for the unique identification numbers.]

[13. A method of addressing messages from a transponder to a selected one or more of a number of communications devices in accordance with claim 12 and further including establishing a predetermined number of bits to be used for the random values.]

[14. A method of addressing messages from an interrogator to a selected one or more of a number of RFID devices, the method comprising:

establishing for respective devices unique identification numbers;

causing the devices to select random values, wherein respective devices choose random values independently of random values selected by the other devices;

transmitting a command using the interrogator requesting devices having random values within a specified group of a plurality of possible groups of random values to respond, the specified group being equal to or less than the entire set of random values, the plurality of possible groups being organized in a binary tree defined by a plurality of nodes at respective levels;

receiving the command at multiple RFID devices, RFID devices receiving the command respectively determining if their chosen random values fall within the specified group and, only if so, sending a reply to the interrogator, wherein sending a reply to the interrogator comprises transmitting the unique identification number of the device sending the reply;

determining using the interrogator if a collision occurred between devices that sent a reply and, if so, creating a new, smaller, specified group using a different level of the tree, the interrogator transmitting a command requesting devices having random values within the new specified group of random values to respond; and, if not, the interrogator re-transmitting a command requesting devices having random values within the first mentioned specified group of random values to respond; and if a reply without collision is received from a device, the interrogator subsequently sending a command individually addressed to that device.]

[15. A method of addressing messages from an interrogator to a selected one or more of a number of RFID devices in accordance with claim 14 wherein the first mentioned specified group contains both a device that is within communications range of the interrogator, and a device that is not within communications range of the interrogator, and wherein the device that is not within communications range of the interrogator does not respond to the transmitting of the command or the re-transmitting of the command.]

[16. A method of addressing messages from an interrogator to a selected one or more of a number of RFID devices in accordance with claim 14 wherein the first mentioned specified group contains both a device that is within communications range of the interrogator, and a device that is not within communications range of the interrogator, and wherein the device that is within communications range of the interrogator responds to the transmitting of the command and the re-transmitting of the command.]

[17. A method of addressing messages from an interrogator to a selected one or more of a number of RFID devices in accordance with claim 14 wherein a device in the first mentioned specified group is capable of changing between being within communications range of the interrogator and not being within communications range of the interrogator over time.]

[18. A method of addressing messages from an interrogator to a selected one or more of a number of RFID devices in accordance with claim 14 wherein the devices respectively comprise an integrated circuit including a receiver, a modulator, and a microprocessor in communication with the receiver and modulator.]

[19. A method of addressing messages from an interrogator to a selected one or more of a number of RFID devices in accordance with claim 14 and further comprising, after the interrogator transmits a command requesting devices having random values within the new specified group of random values to respond;

devices receiving the command respectively determining if their chosen random values fall within the new smaller specified group and, if so, sending a reply to the interrogator.]

[20. A method of addressing messages from an interrogator to a selected one or more of a number of RFID devices in accordance with claim 19 and further comprising, after the interrogator transmits a command requesting devices having random values within the new specified group of random values to respond;

determining if a collision occurred between devices that sent a reply and, if so, creating a new specified group and repeating the transmitting of the command requesting devices having random values within a specified group of random values to respond using different specified groups until all of the devices capable of communicating with the interrogator are identified.]

[21. A communications system comprising an interrogator, and a plurality of wireless identification devices configured to communicate with the interrogator using RF, the interrogator being configured to employ tree searching to attempt to identify individual ones of the multiple wireless identification devices, so as to be able to perform communications without collision between the interrogator and individual ones of the multiple wireless identification devices, the interrogator being configured to follow a search tree, the tree having multiple nodes respectively representing subgroups of the multiple wireless identification devices, the interrogator being configured to transmit a command at a node, requesting that devices within the subgroup represented by the node respond, the interrogator further being configured to determine if a collision occurs in response to the command and, if not, to repeat the command at the same node.]

[22. A communications system in accordance with claim 21 wherein the interrogator is configured to send a command at a different node if a collision occurs in response to the first mentioned command.]

[23. A communications system in accordance with claim 21 wherein a subgroup contains both a device that is within communications range of the interrogator, and a device that is not within communications range of the interrogator.]

[24. A communications system in accordance with claim 21 wherein a subgroup contains both a device that is within communications range of the interrogator, and a device that is not within communications range of the interrogator, and wherein the device that is within communications range of the interrogator responds to the command.]

[25. A communications system in accordance with claim 21 wherein a device in a subgroup is movable relative to the interrogator so as to be capable of changing between being within communications range of the interrogator and not being within communications range.]

[26. A communications system in accordance with claim 21 wherein the wireless identification device comprises an integrated circuit including a receiver, a modulator, and a microprocessor in communication with the receiver and modulator.]

[27. A system comprising:

an interrogator;

a number of communications devices capable of wireless communications with the interrogator;

means for establishing for respective devices unique identification numbers respectively having the first predetermined number of bits;

means for causing the devices to select random values, wherein respective devices choose random values independently of random values selected by the other devices;

means for causing the interrogator to transmit a command requesting devices having random values within a specified group of random values to respond;

means for causing devices receiving the command to determine if their chosen random values fall within the specified group and, if so, to send a reply to the interrogator; and means for causing the interrogator to determine if a collision occurred between devices that sent a reply and, if so, to create a new, smaller, specified group; and, if not, transmit a command requesting devices having random values within the same specified group of random values to respond.]

[28. A system in accordance with claim 27 wherein sending a reply to the interrogator comprises transmitting the unique identification number of the device sending the reply.]

[29. A system in accordance with claim 27 wherein a specified group contains both a device that is within communications range of the interrogator, and a device that is not within communications range of the interrogator.]

[30. A system in accordance with claim 27 wherein the interrogator further includes means for, after receiving a reply without collision from a device, sending a command individually addressed to that device.]

[31. A system comprising:

an interrogator configured to communicate to a selected one or more of a number of communications devices; and a plurality of communications devices; the devices being configured to select random values, wherein respective devices choose random values independently of random values selected by the other devices; the interrogator being configured to transmit a command requesting devices having random values within a specified group of a plurality of possible groups of random values to respond, the specified group being less than the entire set of random values, the plurality of possible groups being organized in a binary tree defined by a plurality of nodes at respective levels, the specified group being defined as being at one of the nodes; devices receiving the command being configured to respectively determine if their chosen random values fall within the specified group and, only if so, send a reply to the interrogator, wherein sending a reply to the interrogator comprises transmitting the unique identification number of the device sending the reply; the interrogator being configured to determine if a collision occurred between devices that sent a reply and, if so, create a new, smaller, specified group using a different level of the tree, the interrogator being configured to transmit a command requesting devices having random values within the new specified group of random values to respond; and, if not, the interrogator being configured to re-transmit a command requesting devices having random values within the first mentioned specified group of random values to respond.]

[32. A system in accordance with claim 31 wherein the first mentioned specified group contains both a device that is within communications range of the interrogator, and a device that is not within communications range of the interrogator.]

[33. A system in accordance with claim 31 wherein a device in the first mentioned specified group is capable of changing between being within communications range of the interrogator and not being within communications range of the interrogator over time.]

[34. A system in accordance with claim 31 wherein the respective devices comprise an integrated circuit including a receiver, a modulator, and a microprocessor in communication with the receiver and modulator.]

[35. A system comprising:

an interrogator configured to communicate to a selected one or more of a number of RFID devices;

a plurality of RFID devices, respective devices being configured to store a unique identification number, respective devices being further configured to store a random value;

the interrogator being configured to transmit a command requesting devices having random values within a specified group of a plurality of possible groups of random values to respond, the plurality of possible groups being organized in a binary tree defined by a plurality of nodes at respective levels, the specified group being defined as being at one of the nodes;

devices receiving the command respectively being configured to determine if their chosen random values fall within the specified group and, if so, send a reply to the interrogator; and, if not, not send a reply; and the interrogator being configured to determine if a collision occurred between devices that sent a reply and, if so, to create a new, smaller, specified group by descending in the tree; and, if not, to transmit a command at the same node.]

[36. A system in accordance with claim 35 wherein the unique identification numbers for respective devices are stored in digital form and respectively comprise a predetermined number of bits.]

[37. A system in accordance with claim 35 wherein the random values for respective devices are stored in digital form and respectively comprise a predetermined number of bits.]

[38. A system in accordance with claim 35 wherein the interrogator is configured to determine if a collision occurred between devices that sent a reply in response to respective Identify commands and, if so, to create further new specified groups and repeat the transmitting of the command requesting devices having random values within a specified group of random values to respond using different specified groups until all responding devices capable of responding are identified.]

*39. A method implemented in a radio frequency identification (RFID) system, the method comprising:*

*transmitting a radio frequency wireless signal from at least one interrogator to cause a plurality of RFID tags to individually generate random numbers;*

*transmitting a first wireless request from the at least one interrogator to request RFID tags having generated random numbers in a first subset of random numbers to reply;*

*if a response to the first request, transmitted from one RFID tag of the plurality of RFID tags, is obtained at the at least one interrogator, repeating the first request; and*

*if no response to the first request is obtained at the at least one interrogator, transmitting a second request from the at least one interrogator to request RFID tags having generated random numbers in a second subset of random numbers to reply.*

*40. The method of claim 39, wherein if no response to the first request is obtained due to response collision, the second subset is a portion of the first subset.*

*41. The method of claim 39, further comprising:*

*the at least one interrogator obtaining the response transmitted from the RFID tag, including an identifier of the RFID.*

*42. The method of claim 39, wherein each of the plurality of RFID tags is affixed to a corresponding object to identify the object.*

*43. The method of claim 39, wherein the first request includes one or more selection bits to identify the first subset.*

*44. The method of claim 39, wherein the plurality of RFID tags are configured to provide responses at time slots determined by random numbers.*

*45. The method of claim 39, wherein the response to the first request includes identifying information of the RFID tag; and the method further comprises:*

*transmitting a wireless command from the at least on interrogator to silence the RFID tag using the identifying information of the RFID tag.*

*46. A radio frequency identification (RFID) reader, comprising:*

*a transmitter to transmit at least a first portion of an identifier to request a first response from an RFID device that has at least a first portion of an identification code equal to the at least first portion of the identifier;*

*a receiver to receive the first response from the device; and*

*a processing circuit coupled to the transmitter and receiver to implement an algorithm to detect at least one from among potentially multiple RFID devices, wherein in accordance with the algorithm the processing circuit is to perform collision detection on the first response and, in response to detecting no collision, to retransmit, via the transmitter, the at least first portion of the identifier and to request a second response thereto.*

*47. The reader of claim 46, wherein the processing circuit is configured to determine an identifier of the RFID device using the first response.*

*48. The reader of claim 47, wherein the identifier of the RFID device comprises a random number generated on the RFID device.*

*49. The reader of claim 47, wherein the transmitter is configured to provide an RF field to be modulated by the RFID device to communicate the first response.*

*50. The reader of claim 46, wherein in accordance with the algorithm the processing circuit is to retransmit no more than the first portion of the identifier.*

*51. The reader of claim 46, wherein the transmitter is configured to communicate at a first bit rate during a first period of time, and at a second bit rate during a second period of time.*

*52. The reader of claim 46, wherein the transmitter is configured to transmit a signal to silence the RFID device and to transmit a wake up command to transition the RFID device from a sleep state.*

*53. The reader of claim 46, wherein in accordance with the algorithm the processing circuit is to transmit, via the transmitter, a signal to silence the RFID device in response to the detecting no collision and before retransmitting the first portion.*

*54. The reader of claim 46, wherein the transmitter is configured to transmit an indication of a first number of time slots from which one or more RFID devices are to randomly select a first time slot in which to communicate a random value identifier to the reader.*

*55. The reader of claim 54, wherein the transmitter is further configured to transmit an indication of a second number of time slots, different from the first number of time slots, responsive to collision detection by the processing circuit.*

*56. A system, comprising:*

*an RFID target device to receive at least a first portion of an identifier, to compare the at least first portion of the identifier to at least a first portion of an identification code of the target device, and to communicate a reply value if the at least first portion of the identifier is equal to the at least first portion of the identification code; and*

*an RFID initiating device to initiate communication with one or more RFID target devices, the initiating device to transmit a first request including a first command and first information, to receive a first response to the first request from each of one or more RFID target devices that has a respective identification code selected by the first information, to perform collision detection on the first response, and to transmit a second request including a retransmission of at least the first command and the first information responsive to detecting no collision.*

*57. The system of claim 56, wherein the target and initiating devices are to implement a time slot method in accordance with a protocol with which the target and initiating devices are compliant.*

*58. The system of claim 57, wherein the target device is to modulate an RF field provided by a remote device to communicate the reply value.*

*59. The system of claim 58, wherein the system is to operate in a selectable one of a first communication mode and a second communication mode in accordance with the protocol, wherein in accordance with the first communication mode the target device is to communicate by modulating a remotely generated RF field and in accordance with the second communication mode the target device is to generate an RF field.*

*60. The system of claim 59, wherein the target and initiating devices are to communicate at a selectable one of a plurality of bit rates in accordance with the protocol.*

*61. The system of claim 60, wherein the target device is to transition from a sleep state upon receiving a wake up command.*

*62. The system of claim 56, wherein the reply value comprises a random number generated by the RFID target device.*

*63. The system of claim 56, wherein the target device is to modulate an RF field provided by a remote device to communicate the reply value.*

*64. The system of claim 56, wherein the initiating device is to transmit a signal to silence the one or more target devices.*

*65. The system of claim 64, wherein the initiating device is to transmit the signal in response to the detecting no collision before transmitting the second request.*

*66. The system of claim 56, wherein the target device is to implement a slotted aloha algorithm in which the target device is to communicate a first identifier in a randomly selected time slot of a number of time slots indicated to the target device.*

*67. The system of claim 66, wherein the first identifier is randomly generated by the target device.*

*68. The system of claim 67, wherein the target device is to modulate a remotely generated RF field to communicate the reply.*

*69. The system of claim 56, wherein the one or more target devices comprises the target device.*

*70. A radio frequency identification (RFID) device, comprising:*

*a memory to store a first identifier;*

*a receiver coupled to an antenna to receive a transmission of a first set of bits from a reader in accordance with an algorithm to enable the reader to determine the first identifier;*

*processing circuitry to compare the first set of bits to a first set of bits of an identification code of RFID device; and*

*a modulating circuit to modulate an RF field produced by the reader to communicate a second set of bits to the reader if the first set of bits is equal to the first set of bits of the identification code, wherein the first identifier comprises the second set of bits, and wherein in accordance with the algorithm the receiver is to further receive a retransmission of at least the first set of bits from the reader if the reader receives the second set of bits without collision.*

*71. The device of claim 70, wherein the second set of bits comprises the first set of bits.*

*72. The device of claim 70, further comprising:*

*a random number generator to generate the first identifier and a random value, wherein the random value is to be used to select a slot in which to communicate the second set of bits in accordance with a time slot method.*

*73. The device of claim 70, wherein the modulating circuit is to operate in an alternate communication mode in which the modulating circuit is to modulate an RF field produced by the device itself.*

*74. The device of claim 70, wherein the modulating circuit is to communicate at one of a plurality of selectable bit rates.*

*75. The device of claim 74, wherein the receiver is receive a wake up command from the reader to transition the device from a sleep state.*

*76. The device of claim 70, wherein the processing circuitry is to implement a slotted aloha algorithm.*

*77. The device of claim 76, further comprising memory storing the identification code, separate from the first identifier.*

*78. The device of claim 70, further comprising memory storing the identification code, separate from the first identifier.*

*79. The device of claim 70, wherein in accordance with the algorithm the receiver is to receive a signal from the reader addressed to the device responsive to the reader receiving the second set of bits without collision.*

*80. The device of claim 79, wherein the signal is to silence the device.*

*81. The device of claim 80, wherein in accordance with the algorithm the signal is to be received by the receiver before the retransmission of the at least first set of bits.*

*82. The device of claim 70, wherein the receiver is to receive an indication of a first number of time slots from which the device is to randomly select a first time slot in which to communicate the first identifier and to receive an indication of a second number of time slots, different from the first number of time slots.*

*83. A radio frequency identification (RFID) method, comprising:*

*transmitting a first wireless radio frequency (RF) signal from an RFID reader, the first RF signal specifying a first set of bits to request a set of RFID devices having the first set of bits to identify themselves, wherein each of the RFID devices generates a random value to select a time slot to identify themselves;*

*receiving at the RFID reader a response to the first RF signal from at least a first RFID device in a first time slot, wherein the first RFID device selects the first time slot to transmit the response in accordance with a first random value generated by the first RFID device and the response including an identifier of the first RFID device;*

*determining the identifier of the first RFID device from the response received in the RFID reader;*

*transmitting a second wireless RF signal from the RFID reader, the second RF signal to prevent the first RFID device from responding when the first RF signal is repeated; and*

*retransmitting the first RF signal from the RFID reader.*

*84. The method of claim 83, wherein the second wireless RF signal silences the first RFID device.*

*85. The method of claim 83, wherein the identifier of the first RFID device comprises a number generated by the first RFID device.*

*86. The method of claim 85, wherein the number is a random number.*

*87. The method of claim 83, wherein the identifier of the first RFID device is a predetermined identification code.*

*88. The method of claim 83, wherein the identifier comprises the first set of bits.*

*89. The method of claim 83, further comprising:*

*identifying by the RFID reader a number of time slots for the set of RFID devices to respond to the first RF signal.*

*90. The method of claim 89, wherein the identifying comprises:*

*transmitting at least one third wireless RF signal from the RFID reader to indicate timing of a plurality of time slots for the set of RFID devices to identify themselves.*

*91. A radio frequency identification (RFID) method, comprising:*

*transmitting a first wireless command from an RFID reader, the first command including a first set of bits to address a set of RFID devices identified by the first set of bits, the first command to request the RFID devices to respond with identifiers of the RFID devices;*

*determining an identifier of at least a first RFID device from at least one reply to the first command;*

*after the determining of the identifier, transmitting a second wireless command from the RFID reader, the second wireless command to silence the first RFID device for a third wireless command; and*

*transmitting the third wireless command from the RFID reader, the third command including the first set of bits to address a set of RFID devices identified by the first set of bits.*

*92. The method of claim 91, wherein the third wireless command is identical to the first wireless command.*

*93. The method of claim 92, wherein the identifier of the first RFID device comprises a number generated by the first RFID device.*

*94. The method of claim 93, wherein the number is a random number.*

*95. The method of claim 92, wherein the identifier of the first RFID device is an unique identification code.*

*96. The method of claim 92, wherein the identifier comprises the first set of bits.*

*97. The method of claim 91, further comprising:*

*identifying by the RFID reader a number of time slots for the set of RFID devices to respond to the first RF signal.*

*98. The method of claim 97, wherein the identifying comprises:*

*transmitting at least one third wireless RF signal from the RFID reader to indicate timing of a plurality of time slots for the set of RFID devices to identify themselves.*

*99. The method of claim 97, further comprising:*

*identifying by the RFID reader a different number of time slots to respond to the fourth RF signal.*

*100. A radio frequency identification method, comprising:*

*transmitting at least a first portion of an identifier to request a first response from a radio frequency device that has at least a first portion of an identification code equal to the at least first portion of the identifier;*

*receiving the first response from the radio frequency device;*

*executing an algorithm to identify at least one from among potentially multiple radio frequency devices, wherein in accordance with the algorithm a processing circuit is to perform collision detection on the first response and, if no collision is detected, retransmitting the at least first portion of the identifier to request a second response;*

*receiving the second response;*

*determining an identifier of the radio frequency device using at least the first response;*

*associating an owner with the identifier of the radio frequency device; and*

*debiting an account held by the owner.*

*101. The method of claim 100, wherein the debiting of the account held by the owner is associated with the payment of a toll.*

*102. The method of claim 101, wherein at least the acts of transmitting at least a first portion and executing an algorithm are performed by apparatus disposed within a toll both, and said method further comprises operating said apparatus disposed within said toll both at least when said radio frequency device issuing said first response is in proximity thereto.*

*103. The method of claim 101, wherein the debiting of the account comprises receiving a credit card number against which the toll can be charged.*

*104. The method of claim 101, wherein at least the act of transmitting at least a first portion is performed by apparatus disposed within a toll both, and said receiving a first response occurs substantially when said radio frequency device issuing said first response is in proximity to said apparatus disposed within said toll booth.*

*105. The method of claim 100, wherein the debiting of the account comprises receiving a credit card number which can be charged.*

*106. The method of claim 100, wherein the debiting of the account held by the owner is for payment for goods or services.*

*107. The method of claim 100, wherein the identifier of the radio frequency device comprises a random number generated on the radio frequency device.*

*108. The method of claim 100, further comprising:*

*transmitting an indication of a first number of time slots from which one or more radio frequency devices are to randomly select a first time slot in which to communicate a random value identifier.*

*109. The method of claim 108, further comprising:*

*transmitting an indication of a second number of time slots, different from the first number of time slots, responsive to collision detection.*

*110. A method implemented in a radio frequency identification apparatus, the method comprising:*

*transmitting a first wireless request from at least one interrogating apparatus to request one or more radio frequency devices having random numbers in a first subset of random numbers to reply;*

*if a response to the first request, transmitted from one radio frequency device of the plurality of radio frequency devices, is obtained at the at least one interrogating apparatus, repeating the first request; and*

*if no response to the first request is obtained at the at least one interrogating apparatus, transmitting a second request from the at least one interrogating apparatus to request radio frequency devices having generated random numbers in a second subset of random numbers to reply;*

*receiving an identifier of one radio frequency device of the plurality of radio frequency devices;*

*associating the identifier of the one radio frequency device of the plurality of radio frequency devices with an account; and*

*debiting the account.*

*111. The method of claim 110, wherein the debiting of the account is associated with the payment of a toll for passage through a tollbooth by the one radio frequency device.*

*112. The method of claim 110, wherein the debiting of the account is for the payment of goods or services.*

*113. The method of claim 112, wherein the debiting of the account occurs pursuant to receipt of a credit card number.*

*114. The method of claim 110, wherein if no response to the first request is obtained due to response collision, the second subset is a portion of the first subset.*

*115. The method of claim 110, wherein the first request includes one or more selection bits to identify the first subset.*

*116. The method of claim 110, wherein the plurality of radio frequency devices are configured to provide responses at time slots determined by random numbers.*

*117. A radio frequency identification method, comprising:*

*transmitting at least a first portion of an identifier to request a first response from a radio frequency device that has at least a first portion of an identification code equal to the at least first portion of the identifier;*

*receiving the first response from the radio frequency device;*

*executing an algorithm to detect at least one from among potentially multiple radio frequency devices, wherein in accordance with the algorithm a processing circuit is to perform collision detection on the first response and, after detecting no collision, retransmitting the at least first portion of the identifier to request a second response;*

*receiving the second response and determining an identifier of the radio frequency device using the first response;*

*associating the identifier of the radio frequency device with a financial account; and*

*debiting the account for the value of at least one of (i) a good; (ii) a service; and/or (iii) a roadway toll, provided to a possessor of the radio frequency device.*

*118. The method of claim 117, wherein the debiting of the account is associated with the payment of a toll, and the method is performed substantially by apparatus disposed within a toll booth through which the radio frequency device passes.*

*119. The method of claim 117, wherein the debiting of the account held by the owner is for the remote payment of goods or services.*

*120. The method of claim 117, wherein the identifier of the radio frequency device comprises a random number generated on the radio frequency device.*

*121. The method of claim 117, further comprising:*

*transmitting an indication of a first number of time slots from which one or more radio frequency devices are to randomly select a first time slot in which to communicate a random value identifier.*

*122. The method of claim 121, further comprising:*

*transmitting an indication of a second number of time slots, different from the first number of time slots, responsive to collision detection.*

*123. A method of conducting a transaction using radio frequency identification apparatus, comprising:*

*operating interrogation apparatus;*

*transmitting via the interrogation apparatus at least a first portion of an identifier to request a first response from a radio frequency device that has at least a first portion of an identification code equal to the at least first portion of the identifier;*

*receiving the first response from the radio frequency device;*

*executing an algorithm to identify at least one from among potentially multiple radio frequency devices, wherein in accordance with the algorithm a processing circuit is to perform collision detection on the first response and, if no collision is detected, retransmitting the at least first portion of the identifier from the interrogation apparatus to request a second response;*

*receiving the second response;*

*determining an identifier of the radio frequency device using at least the first response; and*

*debiting an account associated with the identifier.*

*124. The method of claim 123, wherein the debiting of the account associated with the identifier is pursuant to payment of a toll associated with a tollbooth through which the radio frequency device passes.*

*125. The method of claim 123, wherein at least the acts of transmitting at least a first portion and executing an algorithm are performed by apparatus disposed within a toll both, and said method further comprises operating said apparatus disposed within said toll both at least when said radio frequency device issuing said first response is in proximity thereto.*

*126. The method of claim 124, wherein the debiting of the account comprises receiving a credit card number against which the toll can be charged.*

*127. The method of claim 123, wherein at least the act of transmitting at least a first portion is performed by apparatus disposed within a toll both, and said receiving a first response occurs substantially when said radio frequency device issuing said first response is in proximity to said apparatus disposed within said toll booth.*

*128. The method of claim 123, wherein the debiting of the account comprises receiving a credit card number which can be charged.*

*129. The method of claim 123, wherein the debiting of the account is for payment for goods or services.*

* * * * *

UNITED STATES PATENT AND TRADEMARK OFFICE

CERTIFICATE OF CORRECTION

PATENT NO. : RE42,254 E
APPLICATION NO. : 11/862130
DATED : March 29, 2011
INVENTOR(S) : Clifton W. Wood, Jr.

It is certified that error appears in the above-identified patent and that said Letters Patent is hereby corrected as shown below:

CURRENTLY READS:
COLUMN 26, LINES 1-7 (CLAIM 125)
125. The method of claim 123, wherein at least the acts of transmitting at least a first portion and executing an algorithm are performed by apparatus disposed within a toll both, and said method further compromises operating said apparatus disposed within said toll both at least when said radio frequency device issuing said first response is in proximity thereto.

SHOULD READ:
COLUMN 26, LINES 1-7 (CLAIM 125)
-- 125. The method of claim 123, wherein at least the acts of transmitting at least a first portion and executing an algorithm are performed by apparatus disposed within a toll booth, and said method further compromises operating said apparatus disposed within said toll booth at least when said radio frequency device issuing said first response is in proximity thereto. --

CURRENTLY READS:
COLUMN 26, LINES 12-17 (CLAIM 127)
127. The method of claim 123, wherein at least the act of transmitting at lest a first portion is performed by apparatus disposed within a toll both, and said receiving a first response occurs substantially when said radio frequency device issuing said first response is in proximity to said apparatus disposed with said toll booth.

SHOULD READ:
COLUMN 26, LINES 12-17 (CLAIM 127)
-- 127. The method of claim 123, wherein at least the act of transmitting at lest a first portion is performed by apparatus disposed within a toll booth, and said receiving a first response occurs substantially when said radio frequency device issuing said first response is in proximity to said apparatus disposed with said toll booth. --

Signed and Sealed this
Eleventh Day of October, 2011

David J. Kappos

David J. Kappos
*Director of the United States Patent and Trademark Office*